Aug. 25, 1959 R. A. RICHARDSON ET AL 2,901,601

RADIO RECEIVER WITH IMPULSE NOISE BLANKING

Filed Feb. 19, 1957

INVENTORS
Roy A Richardson
Jona Cohn
BY Mueller & Aichele
Attys.

United States Patent Office 2,901,601

Patented Aug. 25, 1959

2,901,601

RADIO RECEIVER WITH IMPULSE NOISE BLANKING

Roy A. Richardson, Skokie, and Jona Cohn, Chicago, Ill., assignors to Motorola, Inc., Chicago, Ill., a corporation of Illinois Application February 19, 1957, Serial No. 641,790

21 Claims. (Cl. 250—20)

This invention relates generally to noise elimination in radio receivers and more particularly to an improved noise silencer or blanking circuit for radio communications receivers. This application is a continuation-in-part of application Serial No. 400,458 filed December 28, 1953, now abandoned.

It is well known in the communication field that electrical disturbances of various sorts are serious impediments to radio communication. The sources of these electrical disturbances are first, atmospheric static and second, man-made static resulting from electrical equipment in common use.

In mobile and portable radio equipment, problems produced by static, and especially man-made static, are particularly acute for the reason that transmitters are frequently of moderate or low power for the distances over which communication is desired and this means that a received signal will seldom be much stronger than nearby disturbance pulses. Furthermore, a mobile receiver unit may be in an area which is not only remote from the transmitter device, but it may be located in proximity to many sources of man-made static, for example, auto ignition systems, power lines, X-ray machines, and the like. In such situations, it is not unknown to find reception very difficult.

It is an object of the present invention to provide an improved noise silencer for a frequency modulation receiver to prevent the reproduction of static in the receiver loudspeaker.

Another object of the invention is to provide an electron valve circuit for blanking out a portion of the signal in a radio receiver during reception of noise pulses which have amplitudes above that of the desired signal.

Still another object is to provide a noise silencer for a radio receiver which is automatically disabled when a strong adjacent channel signal enters the silencer to prevent modulation transfer when a desired signal and an adjacent channel signal are both received.

A feature of the invention is the provision of a highly selective radio receiver having an amplitude modulation detector connected thereto for detecting noise disturbances and impressing the same upon a stage of the receiver thereby biasing it to cut off.

A further feature of the invention is the provision of a high gain communications receiver including a noise silencer circuit which derives signals which may include noise pulses from the plate of the receiver first mixer, amplifies the signals, detects a noise pulse thereon, and couples it as a negative pulse to cut off the first intermediate frequency amplifier tube for the duration of the pulse. The selective circuits of the receiver following the first intermediate frequency amplifier release stored energy to fill in the gap produced by cutting off this amplifier.

Another feature is the provision of a noise silencer circuit which utilizes a pulse detector including capacitors therein and which includes rectifier means for discharging the capacitors after reception of a noise pulse to render the system immediately responsive to reception of further noise pulses.

Still another feature of the invention is the provision of a noise pulse detector and a pulse amplifier to produce a negative pulse strong enough to cut off an intermediate frequency amplifier in the receiver, with electron valve means for producing a bias to cut off the pulse amplifier, thereby disabling the silencer, when a steady adjacent channel signal is received.

Further objects, features, and the attending advantages of the invention will be apparent upon consideration of the following description and the accompanying drawing in which.

In practicing the invention, a highly selective frequency modulation superheterodyne receiver is provided including a noise silencer circuit having means for detecting noise above the carrier level. Signals at the output of the first mixer valve are applied to a radio frequency amplifier and then detected to convert any amplitude variations, and particularly noise disturbances above the carrier level, into pulses. The pulses are amplified and utilized to cut off an intermediate frequency amplifier valve for the duration of the pulse. The selective circuits of the receiver fill in the gap produced in the signal by the silencing action, so that the action is not detected in the receiver audio output. The pulse detector includes capacitors and there is an electron valve to discharge these capacitors when a pulse has ceased so that the system will be immediately responsive to any following pulses. In order to prevent modulation transfer by the silencer due to beating of an adjacent channel signal and the desired signal in the noise detector, a carrier wave detector is provided which converts large amplitude carrier signals into a negative bias for cutting off the pulse amplifier during reception of a strong adjacent channel signal.

Figure 1:
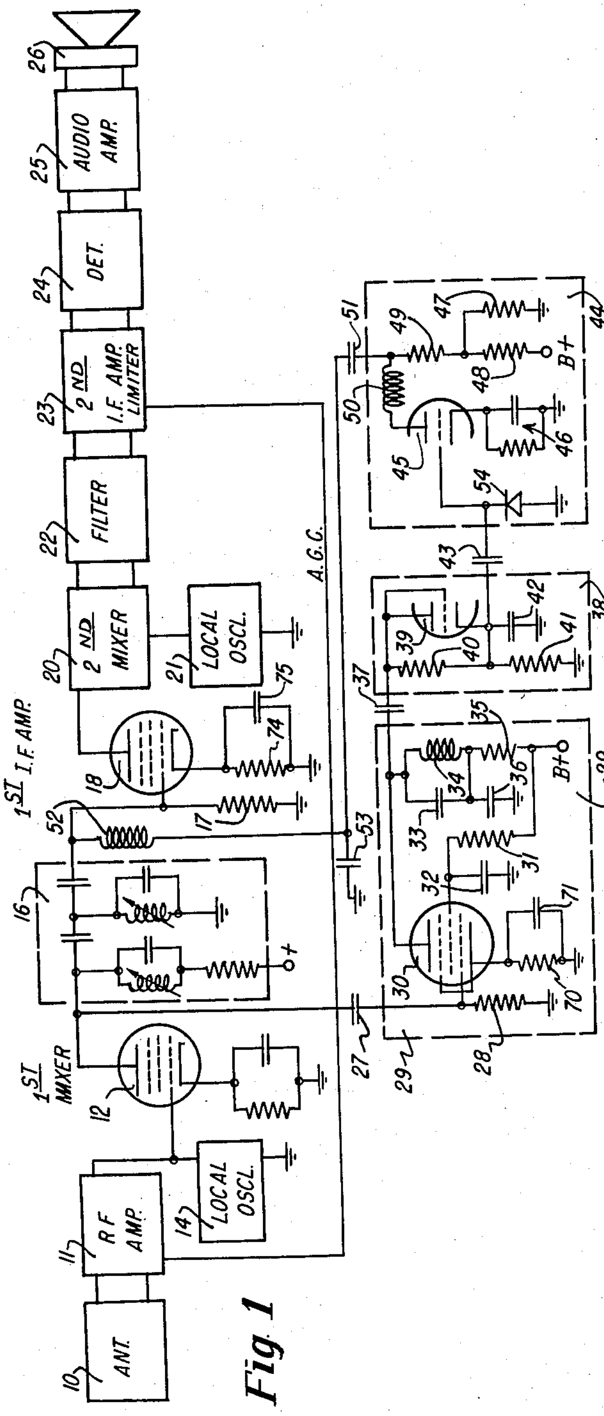
Fig. 1 is a diagram of a frequency modulation receiver including the noise silencer in accordance with the invention.

In Fig. 1 there is illustrated a frequency modulation receiver of the double intermediate frequency type which has been found to be quite effective at frequencies commonly used in very high frequency communication.

The following general description applies to the receiver shown which may well be one of the type disclosed in Magnuski Patents Nos. 2,608,648 and 2,608,649 issued August 26, 1952. It is to be understood, however, that the invention is not limited to use in any particular receiver.

Antenna system 10 is connected to radio frequency amplifier 11 which passes the signal to first mixer valve 12. The oscillator 14 provides a signal differing from the desired incoming signal by a fixed amount to develop the first intermediate frequency. The first intermediate frequency may be of the order of 8 mc. thereby providing a high image ratio. From the first mixer valve 12 the signal is fed into a filter 16 and is then developed across resistor 17 which forms the input to the first intermediate frequency amplifier valve 18. The second mixer 20 is connected to amplifier valve 18 and the signal is beat down to the order of 455 kc. by a fixed signal from oscillator 21. With the signal at this frequency, great selectivity and amplification are easily obtained.

The desired signal now at 455 kc. is passed into the selective filter 22 which may be a highly selective passive band-pass filter as described in the aforesaid patents. Whereas the bandwidth in the preceding stages of the receiver including the filter 16 is relatively wide, the bandwidth of the filter 22 is much more narrow. The selected signal is applied to a high gain second intermediate frequency amplifier 23. Demodulation occurs in detector 24 with the resulting signal being amplified to a desired level by audio amplifier 25. A reproducer 26 may then render the signal audible. Automatic gain control is also shown by the lines marked AGC and is connected in a known manner.

Returning now to the output of the mixer 12, it is seen that a connection is made at the input to the intermediate frequency filter 16, through coupling capacitor 27 and to the input resistance 28 of radio frequency amplifier 29. Signals coupled into amplifier 29 may consist of the desired signal, which might be at 8 mc., and noise disturbances from electrical apparatus near the receiver. It may also be possible that a strong adjacent channel signal would exist at this point. In any event, all of these signals will be amplified by electron valve 30.

Bias for the valve 30 is obtained from resistor 70 and by-pass is effected through capacitor 71. The screen voltage is supplied by dropping resistor 31 which is by-passed through capacitor 32. Signals from valve 30 are developed across the parallel resonant circuit consisting of capacitor 33 and inductor 34. Radio frequency decoupling for the amplifier is provided by resistor 35 and capacitor 36.

The amplified signal is coupled to a positive pulse detector 38 through capacitor 37 where any sudden amplitude variations in the signal from 29 are converted into pulses. The detector consists of electron valve 39, which here is shown as one-half of a double triode connected as a diode, the resistors 40, 41 and radio frequency by-pass capacitor 42. Pulses coming from the detector 38 are developed across capacitor 42 and coupled through capacitor 43 into a pulse amplifier 44 where amplification takes place in electron valve 45. Resistor capacitor combination 46 provides bias for the valve and resistors 47 and 48 form a bleeder which fixes a plate potential for the valve 45, this being coupled to the valve through load resistor 49. Choke 50 is used to filter out any radio frequency exitsing at this point.

It may be noted that the positive pulses detected by 38 and impressed on the valve 45 in the amplifier 44 will consist of negative pulses at the output of amplifier 44 which pulses are coupled to the input grid of the first intermediate frequency amplifier valve across resistor 17. Circuitry for this consists of coupling capacitor 51, filter choke 52, and by-pass capacitor 53. The coupling capacitors 43 and 51 will apply only the alternating current component of the detector 38 to the grid of tube 18 so that the blanking operation will not be produced by the direct current component produced by the detector. Therefore, brief amplitude variations in the signals at the input to intermediate frequency filter 16 will be detected and amplified and impressed across resistor 17 as negative pulses. Through the proper choice of valve 18 and its associated bias resistor 74 and by-pass capacitor 75, the negative pulses entering the input of valve 18 will have sufficient amplitude to cause it to stop conducting, thereby silencing the receiver at the first intermediate frequency stage. The intermediate frequency filter 16 will provide a delay in the signals applied therethrough and will delay the noise pulses so that by the time they reach the intermediate frequency amplifier valve 18, this valve will be rendered non-conducting by the pulses from the amplifier 44.

To insure that conduction of valve 18 will be stopped for no more than the duration of a particular pulse, diode 54 is provided in the input circuit of pulse amplifier 44. This diode, here shown as a crystal diode, will quickly discharge capacitors 42 and 43 upon cessation of conduction of valve 39 so that reception of the desired signal in the stages following the first intermediate frequency amplifier stage may be immediately resumed. Thus, if a relatively small noise pulse enters the detector 38, immediately after reception of a large powerful one, capacitors 42 and 43 will be discharged immediately on cessation of the large one and will be prepared to be charged by the small one thereby silencing the receiver again. It is seen then that the silencer may thus handle noise pulses occurring at a rapid rate.

At this point it should be mentioned that silencing of the entire receiver for the duration of a noise pulse will have little or no discernible effect on intelligibility of signals as reproduced in 26. By deriving the noise signals from the output of the first mixer stage, pulses coupled to the silencer will still be of comparatively short duration because they have not passed through the high Q tuned circuits of the receiver, namely those in the intermediate frequency filter 22. In other words, the noise pulse will be of short duration in the wide band portion of the receiver which precedes the filter 22, but if allowed to pass would produce much wider pulses in the narrow band portion of the receiver including filter 22 and the succeeding stages. Therefore, to silence the receiver for 10–20 microseconds, which has been found to be the range of auto ignition noise and the like at the output of the first mixer, will have none other than nominal effect on intelligibility, especially in mobile communication equipment in which fidelity is of secondary concern.

Inasmuch as the noise pulses to be eliminated are of very short duration, much shorter than the period of audio signals to be received, the noise silencer circuit may be constructed to apply blanking pulses to the receiver circuit only when the detected noise pulses are of short duration. This will eliminate the possibility of blanking of the signal by audio or other low frequency signals, and also limits the time of blanking so that it is shorter than the period of any audio signals being received so that the blanking does not affect the intelligibility of the audio signal. The circuit including capacitor 43 and amplifier 44 for applying the blanking pulses to the tube 18 may be constructed to apply only pulses having high frequency components.

It is to be noted that the signal for operating the noise silencer is derived at a point in the receiver circuit ahead of the limiter. Accordingly there may be variations in the amplitude of the desired signal. Also the system may be used in receivers operating with signals which include amplitude variations. In such case noise pulses of higher amplitude than the signals may be eliminated and because of the detection efficiency of the rectifier 39 the detected output from the sharp pulses will greatly exceed that from the lesser variations in amplitude. Accordingly, the noise silencer system can be made to operate in response to noise pulses and not in response to amplitude variations in the signal.

Figure 3:
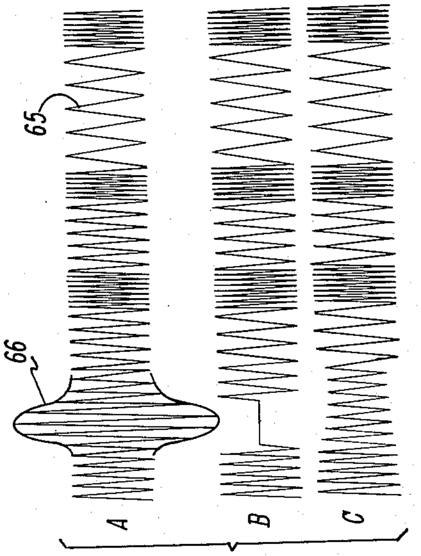
Fig. 3 shows signal waveforms at various points in the receiver circuit.

To graphically illustrate how silencing of the receiver occurs, reference may be had to Fig. 3. In curve A an FM signal 65 is shown as it would appear at the output of the first mixer. At an amplitude greater than that of the signal, a noise pulse 66 is represented. This pulse will enter the silencing circuit which develops a negative pulse that cuts off the first intermediate frequency amplifier for the pulse duration resulting in the desired signal at the output of the first intermediate frequency amplifier assuming a form like that in curve B. At the same time the high Q of the circuits in filter 22 and the gain in amplifier 23 will tend to fill in the gap produced by cutting off the first intermediate frequency amplifier. Energy of the desired signal stored in the filter 22 will be released during blank out of valve 18 by a noise pulse, thereby rendering silence of the receiver even less discernible. Curve C shows this in the representation of the signal entering detector 24.

Also noteworthy is the fact that as the silencer is connected to a point which is isolated from the high gain circuits at 22 and 23, it is less likely to produce transients, or disturbances in the receiver, when valve 18 is cut off. It can therefore be seen that the noise circuit derives its silencing signal at a point where the noise pulse duration is short and then silences the receiver for this short duration at a stage where silencing will have minimum effect on the desired signal as reproduced in the loudspeaker. Although this is a desirable arrangement, it is to be pointed out that satisfactory operation may be obtained when the silencer is connected at other points in a receiver circuit before narrow selectivity is obtained.

The following values have been used in a circuit constructed in accordance with Fig. 1, and although these values are not to be considered as limiting, the circuit using these values provided satisfactory operation.

| | | |
|---|---|---|
| Capacitor 27 | micromicrofarads | 24 |
| Resistor 28 | megohm | 1 |
| Tube 30 | | 6CB6 |
| Resistor 31 | kilohms | 18 |
| Capitor 32 | microfarads | .01 |
| Capacitor 33 | micromicrofarads | 30 |
| Coil 34 | microhenries (approx.) | 10 |
| Resistor 35 | kilohms | 8.2 |
| Capacitor 36 | microfarads | .01 |
| Capacitor 37 | micromicrofarads | 100 |
| Tube 39 | | ½-12AX7 |
| Resistor 40 | kilohms | 470 |
| Resistor 41 | do | 470 |
| Capacitor 42 | micromicrofarads | 24 |
| Capacitor 43 | do | 1,000 |
| Tube 45 | | ½-12AX7 |
| Resistor of 46 | kilohms | 10 |
| Capacitor of 46 | microfarads | .02 |
| Resistor 47 | kilohms | 68 |
| Resistor 48 | do | 150 |
| Resistor 49 | do | 220 |
| Coil 50 | microhenries | 250 |
| Capacitor 51 | microfarads | .01 |
| Coil 52 | microhenries | 500 |
| Capacitor 53 | micromicrofarads | 100 |
| Rectifier 54 | | 1N81 |
| Resistor 70 | ohms | 150 |
| Capacitor 71 | microfarads | .01 |

Figure 2:
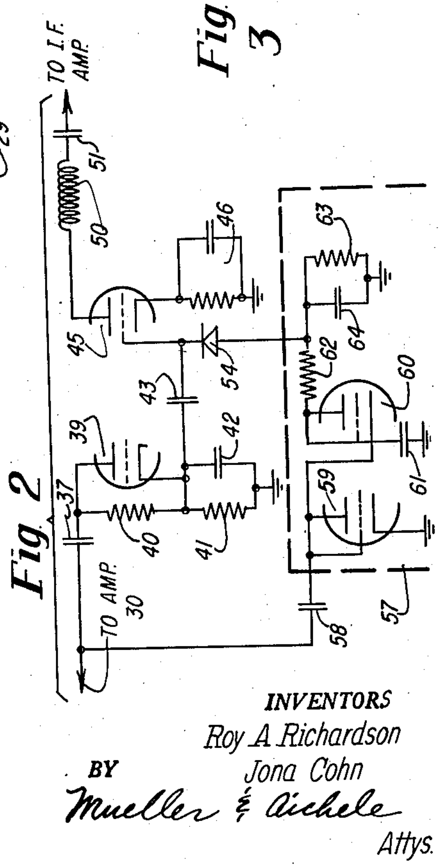
Fig. 2 shows an embodiment of the noise silencer circuit with provision for preventing operation by adjacent channel signals.

As the noise silencer is connected to a point in the receiver ahead of the highly selective circuits, a signal in a channel adjacent to that of the desired signal may be present. Such a signal which is above a critical level might beat with the desired signal in the detector 38 thereby causing the modulation on the adjacent channel to transfer to the desired signal. Although noise pulses which are of greater amplitude than the adjacent channel signal would be detected and operate the silencer, noise pulses of smaller amplitude than the adjacent channel signal would not be detected so that the silencer would not operate. In either case, if the adjacent channel signal is of such a level to cause modulation transfer through the noise silencer circuit, it is preferable to disable the silencer circuit. A circuit for disabling the silencer circuit to prevent modulation transfer therethrough in the presence of a strong adjacent channel signal is shown in Fig. 2.

There it is seen that the output of radio frequency amplifier 29 is connected to the detector through capacitor 37, and is also applied to the biasing circuit 57 through coupling capacitor 58. The circuit at 57 develops a bias from an incoming carrier wave and applies it to the grid of the pulse amplifier which cuts off the valve 45 and disables the pulse amplifier.

In order to develop a bias large enough to insure cut off of valve 45, a voltage doubling circuit is used in 57. As may be seen one half of a dual triode is connected as a diode which will charge capacitor 58. The other half of the dual triode is connected as diode 60, which will charge capacitor 61 to approximately twice the incoming signal votlage by voltage doubling action as is well known in the art. The biasing voltage thus developed across 61 is connected to the input of valve 45 through resistor 62 and diode 54. Resistor 63 serves as a load impedance for bias circuit 57 and when the bias circuit is not working, that is when no strong carrier reaches it, 63 is a D.C. leak path to discharge capacitor 64 which has charged through diode 54. Resistor 62 and capacitor 64 also provide a long time constant RC circuit to prevent the bias circuit 57 from aplying a negative pulse to valve 45 when receiving noise pulses. Capacitor 64 provides a path for rapid discharge of capacitors 42 and 43.

When a strong carrier wave is coupled from radio frequency amplifier 29 a high level bias voltage is produced in the bias circuit and if it is then of sufficient magnitude, amplifier 44 is cut off. That is, when a strong carrier enters the silencer, the silencer circuit is disabled automatically to prevent modulation transfer through the noise circuit under such conditions.

Because of the AGC action the level of a desired signal at the output of the first mixer is not generally great enough to cut off the silencer via the carrier bias circuit. But if it were great enough to do so, the noise pulses commonly encountered will generally be below the desired signal level and so noise silencing is not needed.

In the circuit of Fig. 2 the same values can be used as in the circuit of Fig. 1. The following values have been found to provide satisfactory operation for the additional components.

| | | |
|---|---|---|
| Capacitor 58 | micromicrofarads | 24 |
| Tube 59 | | ½-6BG7 |
| Tube 60 | | ½-6BG7 |
| Capacitor 61 | micromicrofarads | 50 |
| Resistor 62 | kilohms | 220 |
| Resistor 63 | megohm | 1 |
| Capacitor 64 | microfarads | .01 |

Thus it may be seen that the invention has provided a comparatively simple noise silencing circuit which has been illustrated in a frequency modulation receiver. Furthermore, the silencer has been made responsive to a rapid sequence of noise pulses of the type which often seriously hinders high frequency communication, such as produced by auto ignition systems. The system is also effective to eliminate noise resulting from power lines and atmospheric disturbances. And while cutting off part of the receiver for the duration of a noise pulse is the method utilized, the system is arranged to produce little or no loss of intelligibility. By combining further components in the noise silencing circuit, provision is made to disable the silencer automatically should an adjacent channel signal be received which would produce modulation transfer through beating of a desired signal and the adjacent channel signal.

Although certain embodiments of the invention have been described which are illustrative thereof, it is obvious that various changes and modifications can be made therein within the intended scope of the invention as defined in the appended claims.

We claim:

1. In a frequency modulation superheterodyne receiver including a first mixer stage and a first intermediate frequency stage subject to be cut off by application of pulses thereto, the first mixer stage serving to translate a desired signal which may be accompanied by an adjacent channel signal and disturbance pulses of amplitude greater than said desired signal; the noise silencer system including in combination, radio frequency amplifier circuit means including a portion connected to the first mixer, detector circuit means for detection of pulses connected to said radio frequency amplifier circuit means, pulse amplifier circuit means having a portion connected to said detector circuit means and a portion including blocking capacitor means connected to the first intermediate frequency stage for conducting detected and amplified pulses thereto to cut off said intermediate frequency stage thereby, and wave detector circuit means connected to said radio frequency amplifier circuit means for producing a negative bias on reception of a carrier wave of predetermined level, said pulse amplifier circuit means being adapted to be cut off by a negative bias, said wave detector circuit means having a portion connected to said pulse amplifier circuit means for conduction of said negative bias thereto to cut off said pulse amplifier circuit means.

2. A frequency modulation radio receiver including in combination, a first stage for translating a frequency modulated carrier wave which may be accompanied by large amplitude pulses, a second stage following said first stage and including an electron valve having a control electrode coupled to said first stage and adapted to substantially cut off said second stage in response to the application of a negative pulse thereto, selective means following said second stage adapted to store signal energy therein, and a noise silencer circuit including a pulse amplitude detector including input and output circuits, a pulse amplifier including input and output circuits, coupling means connecting said output circuit of said pulse detector to said input circuit of said pulse amplifier, said amplifier serving to increase the amplitude of pulses from said detector and to produce negative pulses at said output circuit of said amplifier in response to the application of pulses from said detector to said input circuit thereof, and direct current blocking means connecting said output circuit of said pulse amplifier to said control electrode of said electron valve of said second stage for interrupting said second stage in response to the application of negative pulses thereto, said selective means releasing stored energy in response to the interruption of said second stage to substantially eliminate the effect of said noise silencer circuit on the receiver output.

3. In a frequency modulation superheterodyne receiver including a signal channel for amplifying and converting a received frequency modulated carrier wave of very high frequency to a frequency modulated wave of lower frequency and means coupled to said channel for thereafter selecting and detecting said wave of lower frequency, and in which the received carrier wave may be accompanied by noise pulses of greater amplitude than the carrier wave, and which signal channel may be interrupted by application of pulses thereto, the noise silencer system including in combination, amplitude detection means connected to capacitor means for charging the same by detected pulses, valve means coupled to said capacitor means to discharge the same upon cessation of a pulse, means coupled to a first portion of the signal channel for applying signals therefrom to said detector means, said amplitude detection means producing output pulses in response to the application thereto of a signal including a carrier wave and pulses of amplitude greater than said wave, coupling means connected to a portion of the signal channel following said first portion thereof for applying a produced output pulse thereto for interrupting said signal channel for the duration of said pulse, and a carrier wave detector for producing a bias voltage in response to a carrier wave above a given level impressed thereon, said carrier wave detector having circuit means connected to said first portion of said signal channel and to said coupling means to interrupt application of output pulses to said signal channel.

4. A pulse noise silencer for a radio receiver including in combination, a mixing stage including an electron valve having an output element, a stage following said mixing stage including an electron valve having an input control element, a positive pulse detector including an electron valve and input and output circuits, said input circuit connected to said output element and said output circuit including a load impedance shunted by a storage capacitor, said storage capacitor being charged to the value of a positive pulse conducted through said valve, means to discharge said storage capacitor upon cessation of conduction of said detector, a pulse amplifier including an electron valve having an output circuit and an input circuit, coupling means connecting said output circuit of said pulse detector to said input circuit of said pulse amplifier, said amplifier serving to increase the amplitude of pulses from said detector and to produce negative pulses at said output circuit of said amplifier in response to positive pulses at said input circuit thereof, and coupling means connecting said output circuit of said pulse amplifier to said input control element of said electron valve of the stage following said mixer stage for cutting off said stage in response to the application of negative pulses thereto.

5. In a frequency modulation receiver including first and second stages connected in a receiver circuit, with the stage being adapted to translate a desired carrier wave which may be accompanied by an adjacent channel carrier wave and disturbance pulses of amplitude greater than said desired carrier wave; the noise silencer system including in combination, radio frequency amplifier circuit means including a portion connected to said first stage, detector circuit means connected to said radio frequency amplifier circuit means for detection of pulses conducted therefrom, pulse amplifier circuit means having a portion connected to said detector circuit means and a portion connected by a direct current blocking path to said second stage for conducting pulses thereto to interrupt said second stage in response to high amplitude pulses, said pulse amplifier circuit including means responsive to a negative bias to interrupt said amplifier upon application of such bias, and wave detector circuit means connected to said radio frequency amplifier circuit means for producing a negative bias on reception of a carrier wave, said wave detector circuit means including rectifier means and capacitor means connected in a voltage doubler circuit, said voltage doubler circuit being connected to said means responsive to a negative bias for application of said negative bias thereto to thereby interrupt said pulse amplifier circuit means in response to a strong carrier wave.

6. In a frequency modulation superheterodyne receiver including a first mixer stage and a first intermediate frequency amplifier stage adapted to be interrupted by application of pulses thereto, the first mixer stage serving to translate a desired signal which may be accompanied by an adjacent channel signal and disturbance pulses of amplitude greater than said signal; the noise silencer system including radio frequency amplifying means having circuit means connected to the mixer stage, pulse detector circuit means connected to said radio frequency amplifying means and having an output circuit including a coupling capacitor and a storage capacitor, said storage capacitor being connected to charge to a value proportional to the value of a pulse detected in said pulse detector, rectifying valve means connected to discharge said coupling capacitor when a pulse ceases, pulse amplifier means having circuit means with a portion connected to said output circuit and a portion connected to the intermediate frequency amplifier stage for conducting pulses thereto to interrupt the same in response to a pulse of high amplitude, and wave detector circuit means connected to said radio frequency amplifying means for producing a negative bias on reception of a carrier wave above a given level, said wave detector circuit means including voltage doubler means connected to said pulse amplifier means through said rectifying valve means for conduction of said negative bias thereto, said pulse amplifier means being adapted to be interrupted by said negative bias.

7. In a frequency modulation receiver including a first stage adapted to translate a desired carrier wave which may be accompanied by disturbance pulses of greater amplitude than the carrier wave and also by carrier waves on adjacent channels, and which receiver includes a second translating stage adapted to be cut off by a negative bias following said first stage; the noise silencer system including in combination, amplitude detector means for detecting pulses received with carrier waves, wave detector means for detecting carrier waves exceeding a predetermined amplitude, coupling means connecting said first receiver stage to said amplitude detector means and to said wave detector means, pulse amplifier means including an input electrode connected to said amplitude detector means, said pulse amplifier means amplifying pulses detected by said amplitude detector means and applying the same as a negative bias to said second receiver stage for cutting off the same, and circuit means connected to said input electrode of said pulse amplifier means including rectifier means and impedance means connected in series between said input electrode and a reference potential, said wave detector means being connected to said impedance means for providing a negative voltage thereacross in response to the reception of a strong carrier wave to bias off said pulse amplifier means and thereby disable the noise silencer system.

8. In a frequency modulation superheterodyne receiver including a first portion in which may appear a frequency modulated carrier wave accompanied by noise pulses of greater amplitude than the carrier wave, and a second portion following said first portion for repeating the frequency modulated carrier wave, and in which the second portion is adapted to be interrupted by a control signal, a noise silencer system for the receiver including an amplitude modulation pulse detector connected to the first portion of the receiver for deriving therefrom noise pulses having amplitude greater than the amplitude of said carrier wave to produce thereby control signals, coupling means connecting said detector to the second portion of the receiver for applying only the alternating current component of said control signals to the second portion to interrupt the same, and detector means responsive to reception of a carrier signal for disabling said noise silencer system when such carrier signal exceeds a predetermined level.

9. In a frequency modulation superheterodyne receiver including a first signal channel for amplifying and converting a received frequency modulated carrier wave of very high frequency to a frequency modulated wave of lower frequency and a second signal channel coupled to said first channel for selecting and detecting the wave of lower frequency, the second channel being adapted to be interrupted by application of control signals thereto and the received carrier wave being of the type which may be accompanied by noise pulses of greater amplitude than the carrier wave, the noise silencer system including in combination, amplitude modulation pulse detector means, means coupled to a first portion of the first signal channel for applying signals therefrom to said detector means, said detector means being adapted to produce control signals in response to the application thereto of a signal including pulses having amplitudes greater than the amplitude of the carrier wave, said detector means including capacitor means and diode discharge means therefor to render said detector means responsive to rapidly recurring individual noise pulses, and means for coupling alternating current only connecting said detector means to a portion of the second signal channel for applying the produced control signals thereto for interrupting said second channel for the duration of said pulses.

10. In a frequency modulation superheterodyne receiver including an antenna for receiving a frequency modulated carrier wave which may be accompanied by noise pulses, detector means for deriving the frequency modulation of the received carrier wave and a channel for connecting the detector to the antenna and adapted to be interrupted by application of control signals thereto and including means for amplifying and converting the received frequency modulated wave, a noise silencer system including an amplitude modulation detector connected to a first point in said channel for deriving control signals from noise pulses at said point having an amplitude greater than the amplitude of the carrier wave at said point, and means connecting said detector to a second point in said channel following said first point for applying said control signals thereto to interrupt said channel in the presence of noise pulses at said first point, means to prepare said detector for deriving a second pulse immediately upon cessation of a first pulse, and means to interrupt said silencing system when noise pulses are accompanied by a carrier wave above a predetermined level.

11. In a superheterodyne receiver including a first portion for translating a radio frequency signal including components of various frequencies resulting from a modulating signal accompanied by noise pulses of greater amplitude than the radio frequency signal, and a second portion following said first portion for repeating the radio frequency signal, and in which the second portion is adapted to be rendered inoperative to repeat the radio frequency signal in response to a control signal of a particular value, a noise silencer system for the receiver including an amplitude modulation pulse detector connected to the first portion of the receiver for producing control pulses from signals applied thereto which exceed a predetermined amplitude, and coupling means connecting said detector to the second portion of the receiver for applying thereto the alternating component only of control pulses having a duration less than the period of the modulation signal, with control pulses applied to said second receiver portion which exceed a particular value rendering said second portion inoperative to repeat the radio frequency signal.

12. In a superheterodyne receiver including a first portion for translating a radio frequency signal including a carrier wave and components of various frequencies resulting from a modulating signal accompanied by noise pulses of greater amplitude than the carrier wave, and a second portion following said first portion for repeating the radio frequency signal, and in which the second portion is adapted to be rendered inoperative to repeat the radio frequency signal in response to a control signal, a noise silencer system for the receiver including an amplitude modulation pulse detector connected to the first portion of the receiver for deriving therefrom noise pulses having amplitudes greater than the amplitude of said carrier wave to produce control pulses, said pulse detector including means providing rapid response to individual noise pulses, coupling means connecting said detector to the second portion of the receiver, said coupling means having constants selected for applying only control pulses having a duration less than the period of the modulation signal to the second portion to interrupt the same, and filter means coupled between the first and second portions of the receiver so that predetermined delay of the carrier wave applied from the first portion to the second portion is provided.

13. A highly selective communications receiver including in combination, a first receiver section for receiving a radio frequency signal having components of various frequencies resulting from a modulating signal and for converting the radio frequency signal to a further signal of lower frequency, said first receiver section including an electron discharge valve and a coupling circuit for applying a signal from a first point in said first receiver section to said electron discharge valve with the signal so applied being delayed, a highly selective filter section having a narrow band width as compared with the band width of said first receiver section for selecting the further signal, said filter section storing signal energy therein, detector and amplifier sections for respectively detecting and translating the modulating signal, and a noise silencer circuit including an amplitude pulse detector connected to said first point of the receiver for producing pulses in response to noise pulses having an amplitude greater than that of the radio frequency signal applied through said coupling circuit, said noise silencer circuit including coupling means connecting said pulse detector to said discharge valve for applying pulses thereto for cutting off said valve, said coupling means applying to said discharge valve only the alternating current component of pulses produced by said pulse detector, said filter section releasing stored signal energy to said detector and amplifier sections during cut off of said valve to provide substantially continuous signals in said detector and amplifier sections.

14. In a highly selective communications receiver including a first receiver section for receiving a radio frequency signal having components of various frequencies resulting from a modulating signal and for converting the radio frequency signal to a further signal of lower frequency, a highly selective filter section for selecting the further signal in a predetermined frequency band and which stores signal energy therein, and detector and amplifier sections for detecting and reproducing the modulating signal, and in which the first receiver section includes an electron discharge valve having an input electrode and a coupling circuit for applying a signal from a first point to the input electrode with the signal so applied being delayed; a noise silencer system for the receiver including an amplitude pulse detector connected to the first point of the receiver for producing pulses in response to noise pulses having an amplitude greater than that of the radio frequency signal applied through the coupling circuit, coupling means connecting said pulse detector to the input electrode of the discharge valve for applying pulses thereto for cutting off the electron valve, said coupling means applying only the alternating current component produced by said pulse detector to the discharge valve, and means connected to said coupling means for disabling the same to interrupt the noise silencer system in response to a radio frequency signal of a predetermined level.

15. In a highly selective communications receiver including a first receiver section for receiving a radio frequency signal having components of various frequencies in accordance with modulation components and for converting the radio frequency signals to a further signal of lower frequency, a highly selective filter section for selecting the further signal in a predetermined frequency band and which stores signal energy therein, and detector and amplifier sections for deriving and reproducing the modulation components, and in which the first receiver section includes an electron discharge valve having an input electrode and a coupling circuit for translating the radio frequency signal in the first receiver section from a first point to the input electrode with the signal so applied being delayed; a noise silencer system for the receiver including an amplitude pulse detector connected to the first point of the receiver for producing control pulses in response to high amplitude portions of the signal applied through the coupling circuit, coupling means connecting said pulse detector to the input electrode of the discharge valve for applying the alternating current components only of said control pulses thereto for cutting off the electron valve, said coupling means applying only pulses having durations less than the periods of the modulation components.

16. In a superheterodyne receiver including a mixer stage and an intermediate frequency stage subject to be cut off by application of control pulses thereto, the mixer stage serving to translate a desired signal which may be accompanied by an adjacent channel signal and disturbing noise pulses; the noise silencer system including in combination, radio frequency amplifier circuit means connected to the mixer, pulse detector circuit means connected to said radio frequency amplifier circuit means, pulse amplifier circuit means connected to said detector circuit means including blocking capacitor means connected to the intermediate frequency stage to apply control pulses thereto, and further detector means connected to said radio frequency amplifier circuit means for producing a control bias in response to signals applied thereto from said radio frequency amplifier circuit means, said pulse amplifier circuit means being adapted to be cut off by a control bias, said further detector means having a portion connected to said pulse amplifier circuit means for applying a control bias thereto to cut off said pulse amplifier circuit means when said bias reaches a predetermined level.

17. A radio receiver including in combination, a first stage for translating a received signal wave which may be accompanied by noise pulses, a second stage following said first stage and including an electron valve having a control electrode signal delay means applying signals from said first stage to said control electrode, said control electrode being adapted to substantially cut off said second stage in response to the application of a control pulse thereto, selective means following said second stage adapted to store signal energy therein, and a noise silencer circuit including a pulse amplitude detector including input and output circuits, means for applying signals from said first stage to said input circuit of said pulse amplitude detector, a pulse amplifier including input and output circuits, coupling means connecting said output circuit of said pulse detector to said input circuit of said pulse amplifier, said amplifier serving to increase the amplitude of pulses from said detector and to produce control pulses at said output circuit of said amplifier in response to the application of pulses from said detector to said input circuit of said amplifier, and direct current blocking means connecting said output circuit of said pulse amplifier to said control electrode of said electron valve of said second stage for cutting off said second stage in response to the application of control pulses thereto, said selective means releasing stored energy in response to the interruption of said second stage to substantially eliminate the effect of said noise silencer circuit on the receiver output.

18. In a radio receiver including a first stage adapted to translate a desired received signal which may be accompanied by disturbance pulses and also by signals on adjacent channels, and which receiver includes a second translating stage following said first stage and adapted to be cut off by a control pulse; the noise silencer system including in combination, pulse detector means for detecting disturbance pulses, second detector means for detecting received signals exceeding a predetermined amplitude, coupling means connecting said first receiver stage to said pulse detector means and to said second detector means, pulse amplifier means including an input electrode connected to said pulse detector means, said pulse amplifier means amplifying pulses detected by said pulse detector means and applying the same as a control signal to said second receiver stage for cutting off the same, and circuit means connecting said input electrode of said pulse amplifier means to a reference potential, said second detector means being connected to said circuit means for providing a control voltage thereto in response to the reception of a strong carrier wave to bias off said pulse amplifier means and thereby disable the noise silencer system.

19. A radio receiver with an impulse noise silencer, including in combination a first receiver portion having relatively wide bandwidth for translating a received radio frequency signal which may be accompanied by noise pulses, a second receiver portion having a relatively narrow bandwidth for translating the radio frequency signal translated by said first receiver portion, signal filter means providing delay of the received signal and having an input coupled to said first receiver portion and further having an output, signal translating means coupled between said output and said second receiver portion and adapted to reduce the level of signals translated thereby in response to a control potential applied thereto, a noise pulse detector coupled to said input of said signal filter means for producing detected pulses in response to the noise pulses, said noise pulse detector including means providing rapid response to individual noise pulses, and pulse coupling means controlled by the detected pulses for applying only control pulses to said signal translating means as control potentials therefor.

20. A multiple conversion superheterodyne radio receiver with an impulse noise silencer, including in combination, a first portion having variable gain amplifier means and relatively wide bandwidth for translating a received radio frequency signal which may be accompanied by noise pulses and including a first mixer, a second portion having a relatively narrow bandwidth for translating the radio frequency signal translated by said first portion and including a second mixer, filter means providing a time delay for the radio frequency signal and the noise pulses and having an input coupled to said first mixer and further having an output, an electron valve coupled between said output and said second mixer and adapted to reduce the level of signals translated thereby in response to a control potential applied thereto, means for applying automatic gain control to said variable gain amplifier means, noise pulse amplifier and detector means coupled to the input of said filter means for producing detected pulses in response to the noise pulses, pulse coupling means controlled by the detected pulses for applying control pulses to said signal translating means as control potentials therefor, and circuit means responsive to a carrier signal for disabling said noise pulse amplifier and detector means upon reception of a carrier signal exceeding a certain level.

21. A multiple conversion superheterodyne radio receiver with an impulse noise silencer, including in combination, a first portion having relatively wide bandwidth for translating a modulated radio frequency signal which may be accompanied by noise pulses and including a first mixer, a second portion having a relatively narrow bandwidth for translating the radio frequency signal translated by said first portion and including a second mixer, filter means providing a time delay for the radio frequency signal and the noise pulses and having an input coupled to said first mixer and further having an output, an electron valve coupled between said output and said second mixer and adapted to reduce the level of signals translated thereby in response to a control pulse applied thereto, noise pulse amplifier and detector means coupled to the input of said filter means for producing detected pulses in response to the noise pulses, said amplifier and detector means including further filter means for rejecting modulation components of radio frequency signals coupled thereto, and pulse coupling means controlled by the detected pulses for applying to said signal translating means control pulses having time durations short with respect to the periods of the modulation components of the radio frequency signal.

References Cited in the file of this patent

UNITED STATES PATENTS 2,527,617 Berger ---------------- Oct. 31, 1950